United States Patent [19]

Wang

[11] Patent Number: 4,873,464

[45] Date of Patent: Oct. 10, 1989

[54] TERMINAL IN AN ELECTRIC MOTOR

[75] Inventor: Patrick S. Wang, Repulse Bay, Hong Kong

[73] Assignee: Johnson Electric Industrial Manufactory Limited, Chaiwan, Hong Kong

[21] Appl. No.: 172,174

[22] Filed: Mar. 23, 1988

[30] Foreign Application Priority Data

Mar. 23, 1987 [GB] United Kingdom ................. 8706841
Jul. 27, 1987 [GB] United Kingdom ................. 8717744

[51] Int. Cl.[4] ......................... H02K 5/14; H02K 13/00
[52] U.S. Cl. ........................................ 310/249; 310/71; 310/239
[58] Field of Search ............................ 310/71, 249, 239; 437/858

[56] References Cited

U.S. PATENT DOCUMENTS

| 3,842,302 | 10/1974 | Apostoleris | 310/249 |
| 4,147,398 | 4/1979 | Lill | 310/71 |
| 4,367,006 | 1/1983 | Rehbogen, Jr. et al. | 439/858 |
| 4,638,203 | 1/1987 | Maki et al. | 310/239 |
| 4,720,646 | 1/1988 | Torimoto | 310/71 |

FOREIGN PATENT DOCUMENTS

| 0260040 | 3/1988 | European Pat. Off. |  |
| 2837437 | 3/1979 | Fed. Rep. of Germany |  |
| 0612322 | 6/1978 | U.S.S.R. | 310/239 |
| 2023942 | 1/1980 | United Kingdom | 310/239 |
| 2173648 | 10/1986 | United Kingdom |  |

Primary Examiner—Patrick R. Salce
Assistant Examiner—Judson H. Jones
Attorney, Agent, or Firm—Fleit, Jacobson, Cohn, Price, Holman & Stern

[57] ABSTRACT

A terminal in an electric motor comprises a generally flat portion in a shallow recess in an outer wall of the motor housing for forming a touch contact with a power supply, and a U-shaped portion housed in a recess for receiving a terminal on a supply lead wire. The U-shaped portion may have a bifurcated arm for receiving a tinned wire lead.

18 Claims, 4 Drawing Sheets

TERMINAL IN AN ELECTRIC MOTOR

INTRODUCTION

The present invention relates to the provision of a terminal in a fractional horsepower electric motor, in particular in a permanent magnet direct current (PMDC) motor.

BACKGROUND

Typically, a terminal for connection of a power supply to an electric motor comprises a tag extending outside the motor, the tag may be received in a female terminal on the end of a supply lead or the supply lead may be soldered on the tag to electrically connect the lead and the tag. The tag itself is electrically connected to brushgear in the motor.

SUMMARY OF THE INVENTION

The present invention provides a fractional horsepower electric motor having a housing, a rotor comprising an armature and a commutator mounted in the housing, and brushgear mounted in the housing, wherein connection means is provided for electrical connection of a power supply to brushleaves of said brushgear, said connection means comprising a conducting metal strip, said strip having a first portion extending over an outside surface of said housing for forming a touch contact with a said power supply, and a second portion housed within a recess in said housing and arranged to make electrical contact with a terminal of a lead of a said power supply when inserted in said recess.

The connection means greatly facilitates the connection of supply leads to the motor brushgear.

The connections may be arranged so that the supply lead may be inserted from the side of the motor or from an end of the motor. Also the arrangement may allow for a suppression element to be connected across the motor brushgear by utilising the unused first or second portions.

Other preferred features and advantages of the invention will be apparent from the following description and the accompanying claims.

DESCRIPTION OF THE PREFERRED EMBODIMENT

Figure 1:
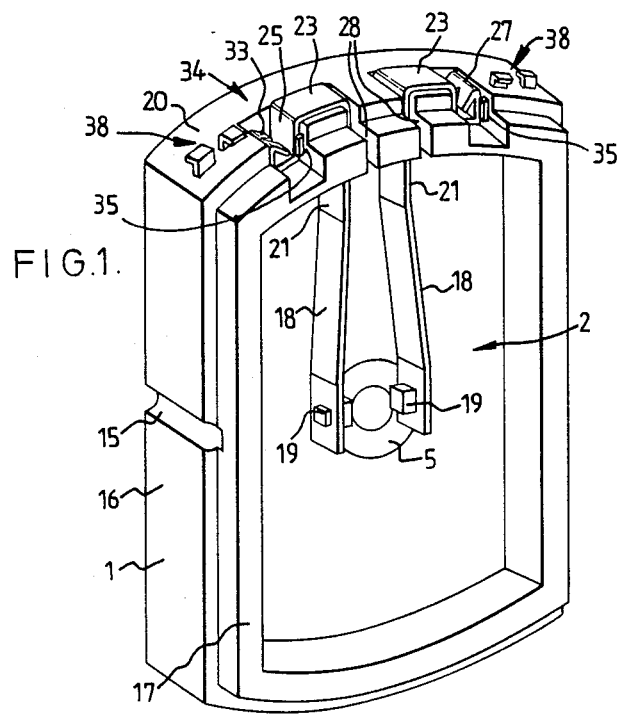
FIG. 1 is a perspective view of the inside of an end cap of a fractional horsepower PMDC motor according to a first embodiment of the invention.
Figure 2:
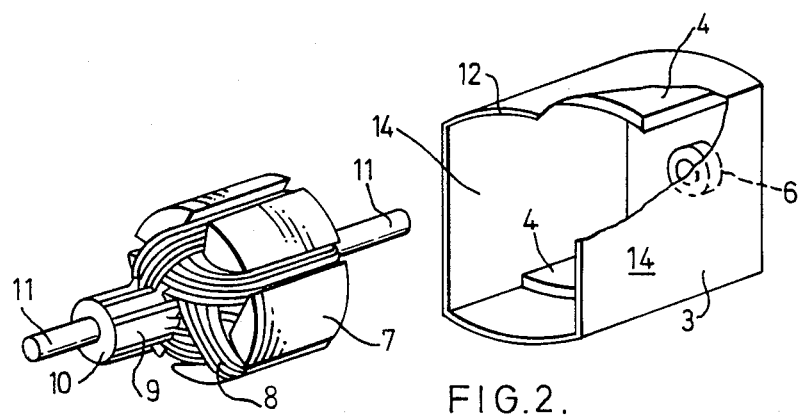
FIG. 2 is an exploded perspective view on a reduced scale, partly cut away, of a casing and motor assembly for use with the end cap of FIG. 1.

Referring to FIGS. 1 to 4, a motor according to the invention comprises an end cap 1 of plastics material, the end cap carrying brushgear designated generally by the reference numeral 2. The motor further comprises a can-like steel casing 3 carrying two opposed permanent magnets 4, and a rotor which is journalled in bearings 5, 6 in the end cap 1 and casing 3 respectively. The magnets are held in the casing by lugs (not shown) pressed from a planar casing sidewall on one side, and a U-shaped spring (not shown) positioned between the magnets on the other side wall. The rotor comprises a shaft 11 carrying a laminated armature 7 having coils 8 wound on arms of the armature. Coils 8 are connected to segments 9 of a commutator 10 on the shaft 11 which is received in the bearings 5, 6.

The end cap 1 closes the open end 12 of the casing 3 and is attached to the casing by lugs (not shown) which are pressed from the casing sidewalls 14 into recesses 15 in sides 16 of the end cap 1. A guide rim 17 is formed on the inner face of the end cap and fits within the open end 12 of the casing 3 to position the end cap 1 securely on the casing 3.

The brush gear 2 comprises a pair of resilient brushleaves 18, each carrying a brush 19. The brushes 19 are mounted in apertures formed in ends of the brushleaves 18 as is well known in the art. Opposite ends 21 of the brushleaves are mounted in a sidewall 20 of the end cap 1. The brushleaves 18 are formed of resilient, electrically conducting copper based alloy. The brushes 19 may be discrete carbon blocks, as shown, or may be formed by the brushleaves 18. In the latter case, a precious metal alloy is deposited on the brushleaf in the region where it contacts the commutator.

The brushleaves 18 are shaped to urge the brushes 19 onto the commutator 10 in the assembled motor.

The general motor construction thus far described is well known in the art and embodied with variations in many commercially available fractional horsepower PMDC motors.

The improvement provided by the present invention resides in the provision of a novel terminal construction 22 at the end 21 of the brushleaves.

Figure 3:
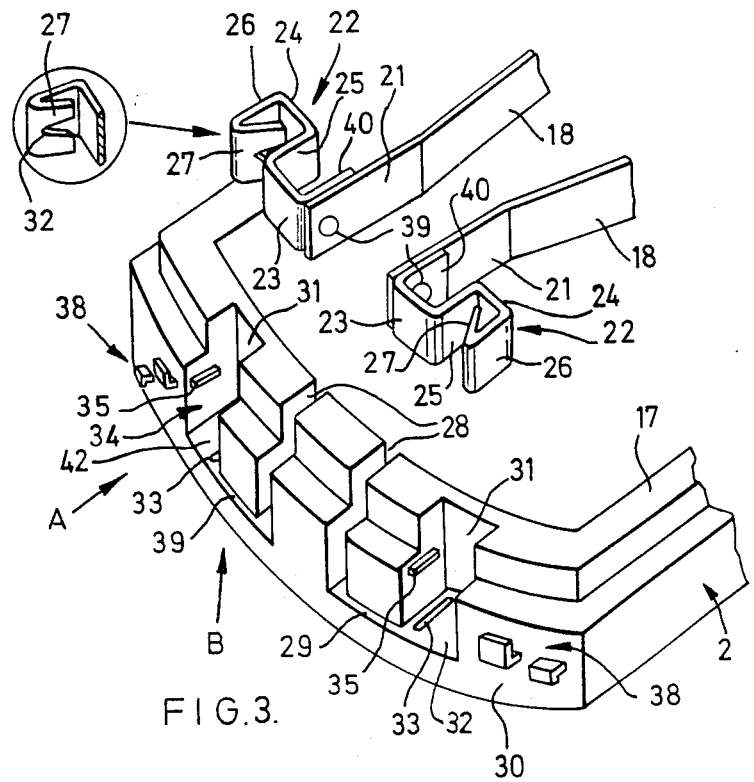
FIG. 3 is an exploded, enlarged perspective view of part of the end cap of FIG. 1.
Figure 4:
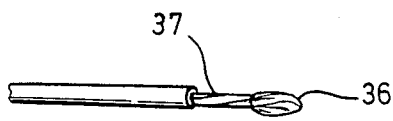
FIG. 4 shows a tinned wire lead.

As best seen by reference to FIG. 3, the terminal 22 is formed by a conducting metal strip having a connecting portion 40 which is riveted by a rivet 39 to the respective brushleaf 18 to form an electrical contact therewith. The terminal is bent substantially at a right angle to form a first, generally flat contact portion 23, and then bent again substantially at a right angle to form a second, U-shaped portion 24, a first arm 25 of the U being connected at its outer end to the contact portion 23, and a second arm 26 of the U-shape being bent at its end to form a resilient, resilient, reentrant metal strip portion 27 which projects into the volume of the U-shape. The strip portion 27 is bifurcated, forming a tapering slot 32 (see the inset of FIG. 3).

The terminal 22 fits into the side wall 20 of the end cap 1. A slot 28 extends across the width of the side wall and receives the brushleaf portion 21 and the connecting portion 40 in the region of the rivet 39. The contact portion 23 is received in a shallow recess 29 in an outer face 30 of the side wall 20, so that the contact portion 23 is flush with the outer face 30 of the side wall 20. The U-shaped portion 24 is received in a recess 31 in the side wall. The recess 31 has an opening 34 at the outer face 30 of the side wall to allow a terminal or wire to be inserted into the recess from the side (arrow A). The terminal 22 is held in the side wall by nibs 35. The nibs 35 serve to keep the terminal 22 away from the end 12 of the casing when the end cap 1 is attached to the casing 3.

Formed in a wall 32 of the recess 31 is an elongate aperture 33 which extends through the remaining depth of the side wall 20.

To assemble the motor, the magnets 4 and the rotor are installed in the casing 3 with bearing 6. The brushleaf 18 and terminal 22 assemblies are inserted in the slots 28 and recesses 31 and the end cap attached to the casing 3.

A terminal of a supply lead may be connected to a terminal 22 from one of two directions. It may be inserted from the side of the motor into recess 32 through the opening 34 (arrow A), or from the end of the motor through the aperture 33 (arrow B). From either direction the terminal displaces the resilient strip portion 27 and so is squeezed between the strip portion 27 and the opposite arm 25 of the U-shape portion 24.

A wire lead 37 may be connected to the terminal portion by first tinning the lead with solder to form a slight blob 36 on the end of the lead. The end of the lead is then hooked into the slot 32, being fed through opening 34. The lead is pulled back slightly to trap the lead in the closed end of the slot 32, the solder blob preventing the lead from being pulled out of the slot. The lead may also be fed through the aperture 33. To facilitate attachment to the strip portion 27 one of the arms of the bifurcated end may be bent slightly out of plane and the slot may slope towards the aperture 33.

An anchor 38 comprising two oppositely facing L-shaped nibs 38 are provided on the end cap 1 to hold the lead in place.

The terminal 22 and brushleaf 18 may be integrally formed from a single strip of material, although better performance may be obtained by using different materials as known in the art.

FIGS. 5 to 9 show a second embodiment of the invention.

Figure 5:
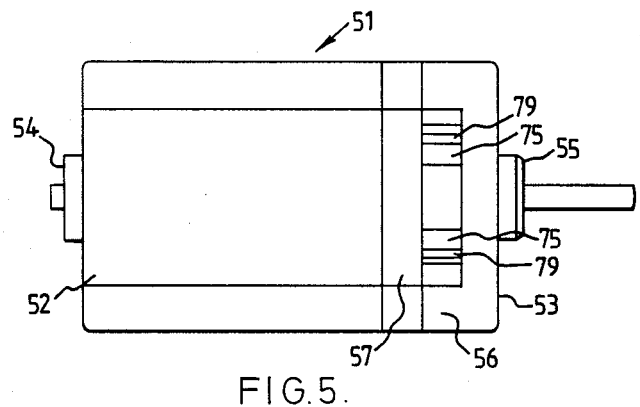
FIG. 5 is a side view of a second embodiment of the invention.

In this embodiment an electric motor 51 has a housing comprising a casing 52 and plastics end cap 53 as seen in FIG. 5. The end cap 53 and casing 52 carry bearings 54, 55 supporting a rotor and permanent magnets, as described in connection with FIGS. 1 to 4.

Figure 7:
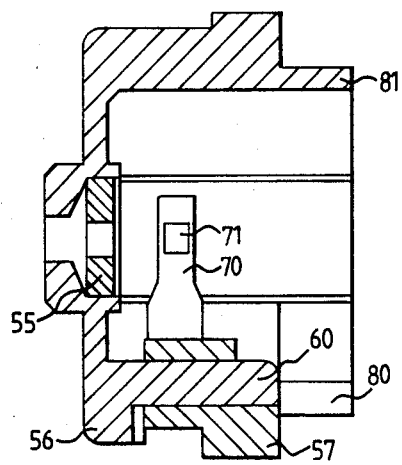
FIG. 7 is a cross-sectional view on line VII—VII of FIG. 6.

The end cap 53 comprises a body 56 and a frame 57 carrying brushgear 59. The frame 57 is mounted on a pin 60 in the body 56, the frame 57 having an aperture 61 which receives the pin 60, as seen in FIG. 7 and 8.

Figure 9:
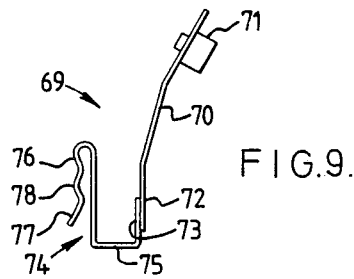
FIG. 9 is a plan view of a brushleaf and terminal of the embodiment of FIG. 5.

The brushgear 59 comprises a pair of brush assemblies 69, one of which is illustrated in side view in FIG. 9. A brushleaf 70 carries a brush 71 at one end and is rivetted at its other end 72 to a connecting portion 73 of a terminal 74. Terminal 74 is similar to terminal 22 of FIGS. 1 and 3 and comprises a first, generally flat touch contact portion 75 and a second, U-shaped portion 76. U-shaped portion 76 has a side arm 77 which is corrugated and has a reinforcing rib 78 pressed into one of the corrugations.

Figure 6:
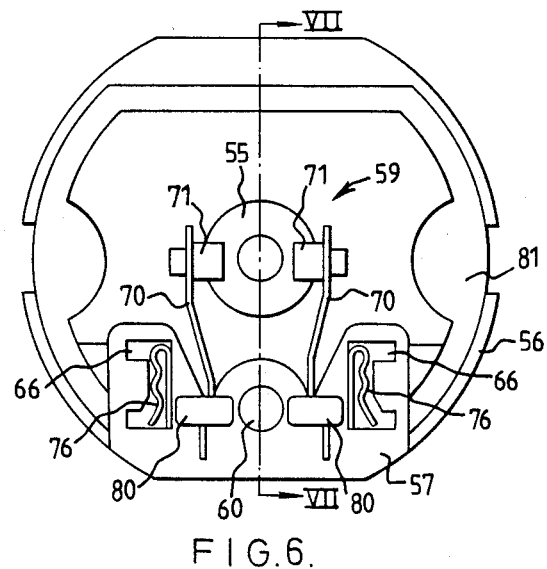
FIG. 6 is a plan view partly cut away of the inside of an end cap the embodiment of FIG. 5.
Figure 8:
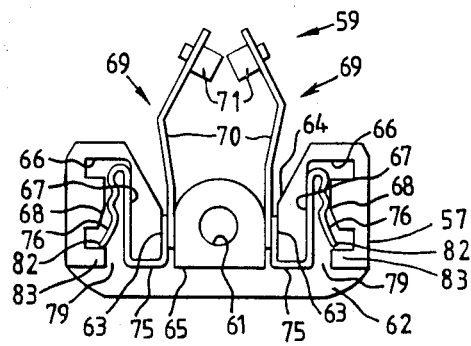
FIG. 8 is an underneath plan view of a frame and brushgear of the embodiment of FIG. 5.

FIG. 8 shows the underside of the frame 57 which is hidden in FIG. 6. The brushleafs 70 are shown in their relaxed position, whereas in FIG. 6 they are shown spaced apart to receive a commutator.

The frame 57 comprises a plastics body 62 having the through aperture 61 for receiving pin 60 as described previously. Two slots 63 extend from an inner wall 64 to an outer wall 65 of the motor and each receive a brush assembly 69, the slot housing the rivet connection between the brushleaf 70 and terminal 74. The outer wall 65 has a shallow recess adjacent the slots 63, the touch contact portions 75 sitting in the recesses, to be generally flush with the wall 65.

The U-shaped portions 76 are each received in a recess 66 in the body 62, between sidewalls 67, 68 thereof. The recesses 66 have a narrow opening 79 on the outer wall 65 for insertion of a terminal (not shown) of a power supply lead. A terminal inserted through opening 79 into the U-shaped portion 76 will resiliently deform the corrugated arm 77 and so be gripped in the recess by the U-shaped portion 76. A free end 82 of the corrugated arms 77 sits behind a stop 83 at the mouth 79 of the recesses 66, to prevent withdrawal of the terminal 74 as a supply terminal is disconnected from the motor by being pulled from the recess 66.

The brush assemblies 69 are mounted in the frame 57 by sliding them downwards into the slot 63 and recess 66. The frame 57 is then attached to the end cap body 56 by pushing it onto pin 60.

The frame 57 has two integrally formed upstanding pins 80 which cooperate with a rim 81 to locate the end cap in the casing 52.

When the end cap is installed on the casing, the terminals 74 will be electrically insulated from the casing by the body 62.

Again, it will be appreciated that the brushleaf 70 and terminal 75 may be integrally formed.

Various modifications may be made to the described embodiments and it is desired to include all such modifications as fall within the scope of the accompanying claims.

What is claimed:

1. A fractional horsepower DC electric motor having a housing, a rotor comprising an armature and a commutator mounted in the housing, and brushgear mounted in the housing for supplying power from a power supply to said commutator wherein a motor terminal is provided on said motor housing for forming each one of a first and second electrical connection between the power supply and a brush of said brushgear, said terminal comprising a conducting metal strip having a first portion which extends across and is supported by an outside surface of said housing and a second portion contiguous with said first portion and housed within a recess in said outside surface of said housing said first portion providing a surface to form said first connection by means of a touch contact and said second portion being arranged to grip a power supply terminal and/or wire lead of said power supply when the power supply terminal or lead is inserted in said recess, thereby to form said second connection.

2. A motor as claimed in claim 1, wherein the second portion is arranged to bear resiliently against a terminal of the power supply to secure it in the recess.

3. A motor as claimed in claim 2, wherein the second portion is generally U-shaped for receiving and gripping the power supply terminal.

4. A motor as claimed in claim 3, wherein the second portion has a free end which projects into the volume of the recess and is resiliently displaced by a power supply terminal inserted in the recess.

5. A motor as claimed in claim 1, wherein a slot is provided in the second portion of the conducting metal strip for receiving and gripping a wire lead of the power supply.

6. A motor as claimed in claim 5, wherein the slot is tapered towards one end thereof, the arrangement being such that a tinned lead may be drawn into the slot to be gripped thereby.

7. A motor as claimed in claim 6, wherein anchoring means is provided on the housing for anchoring the lead to the housing.

8. A motor as claimed in claim 1, wherein said recess has a first opening at one side of the motor housing for insertion into the recess of a power supply terminal and a second opening at an end of the motor housing for alternative insertion of a said power supply terminal.

9. A motor as claimed in claim 1, wherein the brushgear comprises a brushleaf and the housing comprises an end cap, the brushleaf and motor terminal being mounted on the end cap.

10. A motor as claimed in claim 9, wherein the end cap comprises a base part and a holder mounted on the base part, the brushleaf and terminal being mounted on the base part.

11. A fractional horsepower permanent magnet direct current motor having brushgear comprising a pair of brushleaves mounted in an end cap of a housing of the motor and carrying a brush for supplying current to a commutator of the motor, at least one motor terminal mounted on the end cap for connection of a power supply terminal to supply power to a respective one of said brushleaves, the motor terminal being in electrical connection with a said brushleaf, wherein said motor terminal is formed by an electrically conducting metal strip having a first generally flat portion overlaying and supported by an outer surface of the end cap and a second portion contiguous with said first portion and housed in a recess in the outer surface of the end cap, the first portion being arranged to form a touch contact with a power supply terminal of the power supply, and said second portion being arranged to form a gripping contact with a power supply terminal.

12. A motor as claimed in claim 11, wherein the terminal is integral with the brushleaf.

13. A motor as claimed in claim 11, wherein the motor terminal is rivetted to the brushleaf.

14. A motor as claimed in claim 11, wherein the second portion is generally U-shaped and an arm of said U-shape is corrugated, for snugly receiving and gripping a power supply terminal.

15. A motor as claimed in claim 14, wherein said first portion is received in a shallow recess in the outer surface of the end cap.

16. A motor as claimed in claim 15, wherein the end cap comprises a base part and a holder, the at least one terminal and the brushleaves being mounted on the base part and said base part being mounted on the end cap.

17. A motor as claimed in claim 16, wherein the at least one terminal and brushleaves are sandwiched between the base part and holder.

18. A motor as claimed in claim 17, wherein two motor terminals are provided, each being in electrical connection with a respective brushleaf.

* * * * *